Dec. 15, 1970     R. R. CANDOR ET AL     3,546,783
ELECTROSTATIC APPARATUS
Original Filed March 7, 1966     5 Sheets-Sheet 1

INVENTORS
ROBERT R. CANDOR &
JAMES T. CANDOR

BY
*Candor & Candor*

THEIR ATTORNEYS

INVENTORS
ROBERT R. CANDOR &
JAMES T. CANDOR

Dec. 15, 1970  R. R. CANDOR ET AL  3,546,783
ELECTROSTATIC APPARATUS
Original Filed March 7, 1966  5 Sheets-Sheet 5
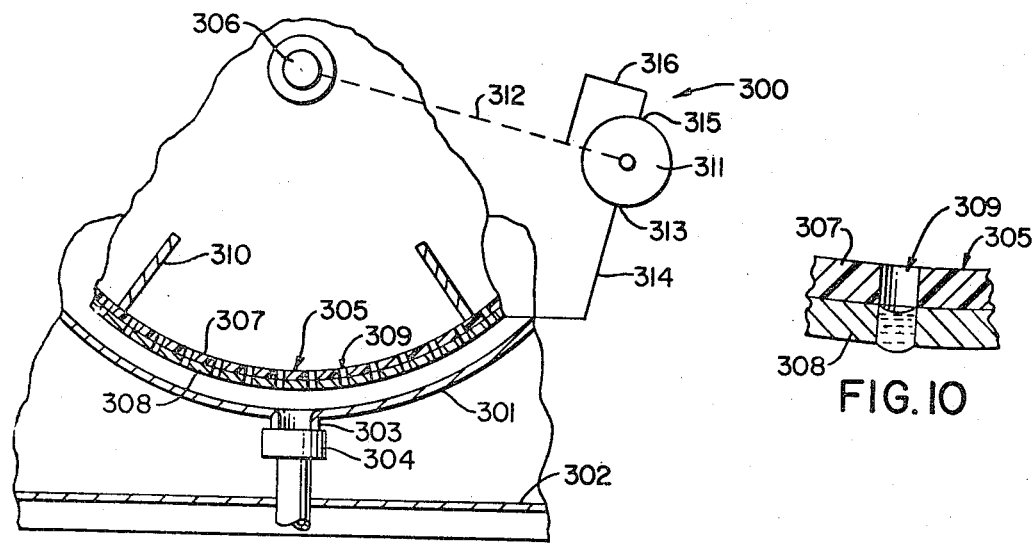
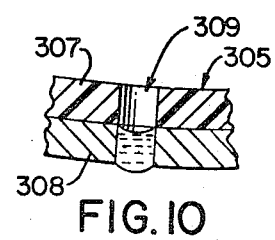
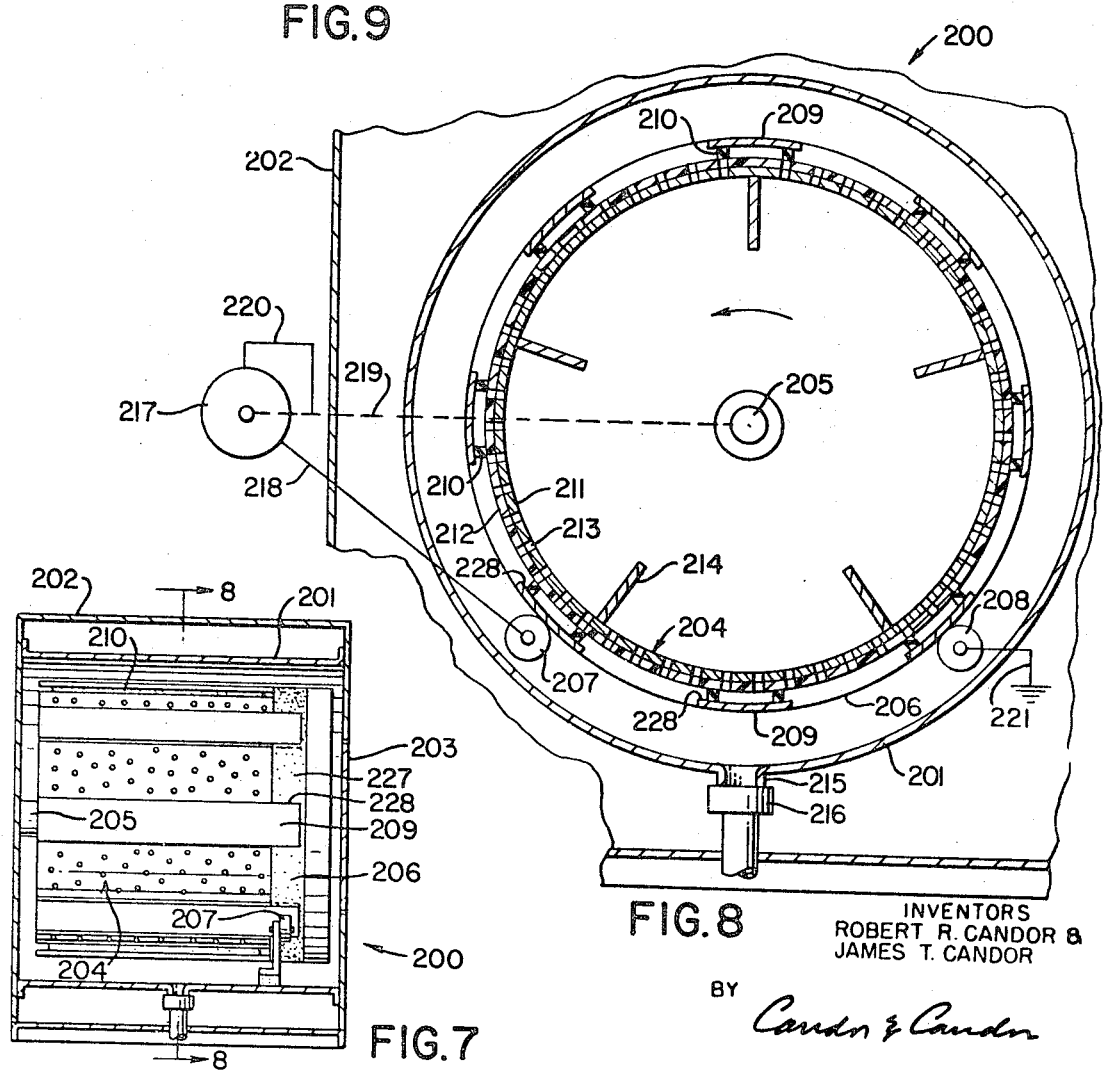
INVENTORS
ROBERT R. CANDOR &
JAMES T. CANDOR
BY
THEIR ATTORNEYS

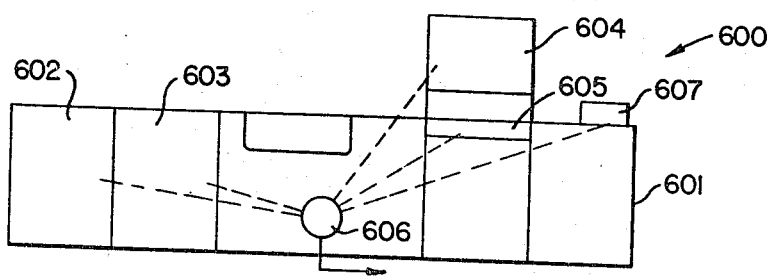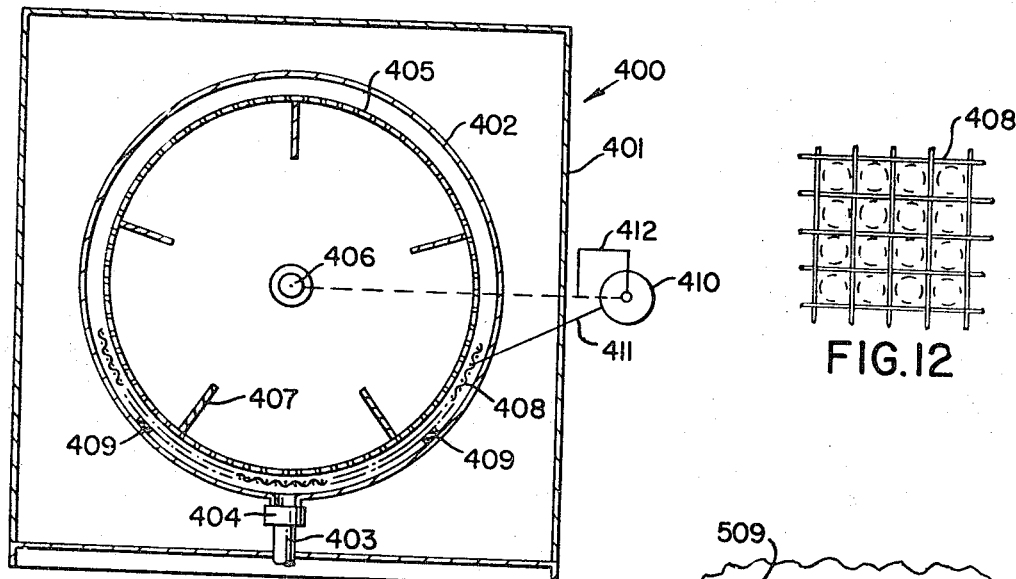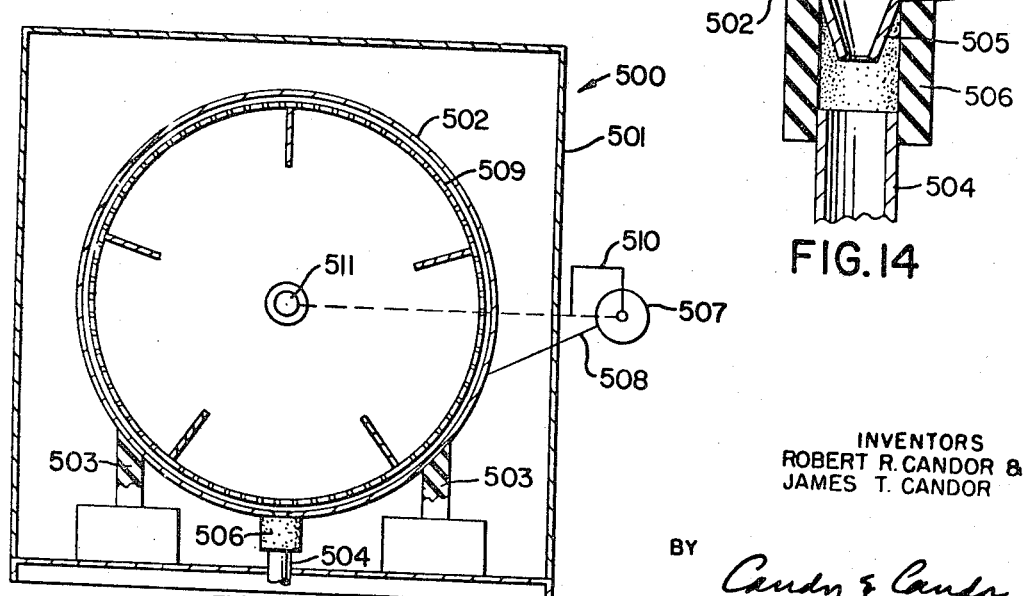

Dec. 15, 1970     R. R. CANDOR ET AL     3,546,783
ELECTROSTATIC APPARATUS
Original Filed March 7, 1966     5 Sheets-Sheet 5

INVENTORS
ROBERT R. CANDOR &
JAMES T. CANDOR

BY

THEIR ATTORNEYS

United States Patent Office 3,546,783
Patented Dec. 15, 1970

3,546,783
ELECTROSTATIC APPARATUS
Robert R. Candor, 5940 Munger Road, Dayton, Ohio 45459, and James T. Candor, 5440 Cynthia Lane, Dayton, Ohio 45429
Application Jan. 31, 1968, Ser. No. 701,946, now Patent No. 3,470,716, which is a continuation-in-part of application Ser. No. 639,354, May 18, 1967, which is a CIP of application Ser. No. 532,266, Mar. 7, 1966, which in turn is a CIP of application Ser. No. 219,587, Aug. 27, 1962. Divided and this application Aug. 6, 1969, Ser. No. 848,055
Int. Cl. B01k 5/00
U.S. Cl. 34—1
24 Claims

ABSTRACT OF THE DISCLOSURE

This disclosure relates to a laundry apparatus, dishwashing apparatus, cooking apparatus or the like wherein the moisture or the like in the wet laundry, on the dishes in the cooking apparatus or the like, is removed by an electrostatic means that provides a differential in the potential of the moisture or the like and an electrode means to tend to cause the moisture to leave the laundry, dishes, cooking apparatus or the like and move toward the electrode means. Such electrode means can comprise a suction nozzle which tends to draw a large volume of air through the laundry, over the dishes or the like adjacent thereto to also tend to direct the moisture from the article means or the like toward the electrode means.

---

This application is a divisional patent application of its copending parent patent application, Ser. No. 701,946, filed Jan. 31, 1968, now Pat. No. 3,470,716, which, in turn, is a continuation-in-part of its copending patent application, Ser. No. 639,354, filed May 18, 1967 now Pat. No. 3,405,452, which, in turn, is a continuation-in-part of its copending patent application, Ser. No. 532,266, filed Mar. 7, 1966, now Pat. No. 3,330,136 which, in turn, is a continuation-in-part of its copending patent application, Ser. No. 219,587, filed Aug. 27, 1962, now Pat. No. 3,238,750.

This inveniton relates to an improved laundry machine, dishwashing apparatus, cooking apparatus and the like and to an improved method for treating laundry, dishes, cooking products and the like.

In particular, one embodiment of this invention comprises a substantially air-tight and non-collapsible confining means or structure having a rotatable foraminous carriage being adapted to support laundry or the like therein. Means are provided for selectively reducing and maintaining the air pressure inside the confining means at any selected pressure below the air pressure outside of the confining means.

In this manner, when the laundry machine is being utilized as a drying machine for removing moisture from wet laundry disposed in the foraminous carriage, the moisture in the wet laundry more readily evaporates in the reduced atmosphere in the confining means than it would evaporate if the confining means contained air at normal atmospheric conditions.

By heating the reduced atmosphere in the confining means to a temperature to cause the moisture in the wet laundry to boil, more rapid evaporation is effected without having to raise the temperature thereof to the normal boiling point of the moisture. In this same vein, auxiliary heating means can be dispensed with if the air pressure in the confining means is lowered to such an extent that the latent heat of the wet laundry is sufficient to cause the moisture to boil at the reduced atmospheric conditions.

When the laundry machine is being utilized to treat laundry with water or the like, the atmosphere in the confining means can be lowered to such an extent that the latent heat of the water causes it to boil whereby the bubbling action of the boiling water further enhances the treating of the laundry by the water or the like disposed in the laundry machine. In this same vein, auxiliary heating means may be utilized to supplement the raising of the temperature of the water to boil at the reduced air pressure.

In addition, electrostatic means of this invention can be utilized in combination with the previously described suction means or by itself to remove liquid from the wet laundry.

Therefore, it can be seen that the apparatus of this invention can be a washing machine, a drying machine, or a combination washing and drying machine and is thus designated as a "laundry machine" but may have uses other than operating on laundry and is not to be limited to such use. For example, the same can be utilized for a dry cleaning machine, etc.

Further, one of the features of this application is to illustrate, describe and claim how certain of the previously described features of the electrostatic means, with or without the previously described suction means, can be utilized in dishwashers, cooking apparatus and the like.

Accordingly, it is an object of this invention to provide an improved laundry, dishwashing and cooking apparatus or the like having one or more of the novel features set forth above as hereinafter shown or described.

Another object of this invention is to provide an improved method for treating laundry, dishes, cooking products and the like having one or more of the novel features set forth above or hereinafter shown or described.

Other objects, uses and advantages of this invention are apparent upon a reading of this description which proceeds with reference to the accompanying drawings forming a part thereof and wherein:

FIG. 7 is a view similar to FIG. 2 and illustrates another laundry apparatus of this invention.

FIG. 8 is a partial, enlarged cross-sectional view taken substantially on line 8—8 of FIG. 7.

FIG. 9 is a view similar to FIG. 8 and illustrates another embodiment of this invention.

FIG. 10 is an enlarged, fragmentary, cross-sectional view of the drum means of the laundry apparatus of FIG. 9.

FIG. 11 is a view similar to FIG. 8 and illustrates another laundry apparatus of this invention.

FIG. 12 is an enlarged, fragmentary view of part of the electrode means of the laundry apparatus of FIG. 11.

FIG. 13 is a view similar to FIG. 11 and illustrates another laundry apparatus of this invention.

FIG. 14 is an enlarged, fragmentary, cross-sectional view of the outlet means of the laundry apparatus of FIG. 13.

FIG. 15 is a schematic view illustrating a typical kitchen counter arrangement utilizing various apparatus of this invention.

Figure 1:
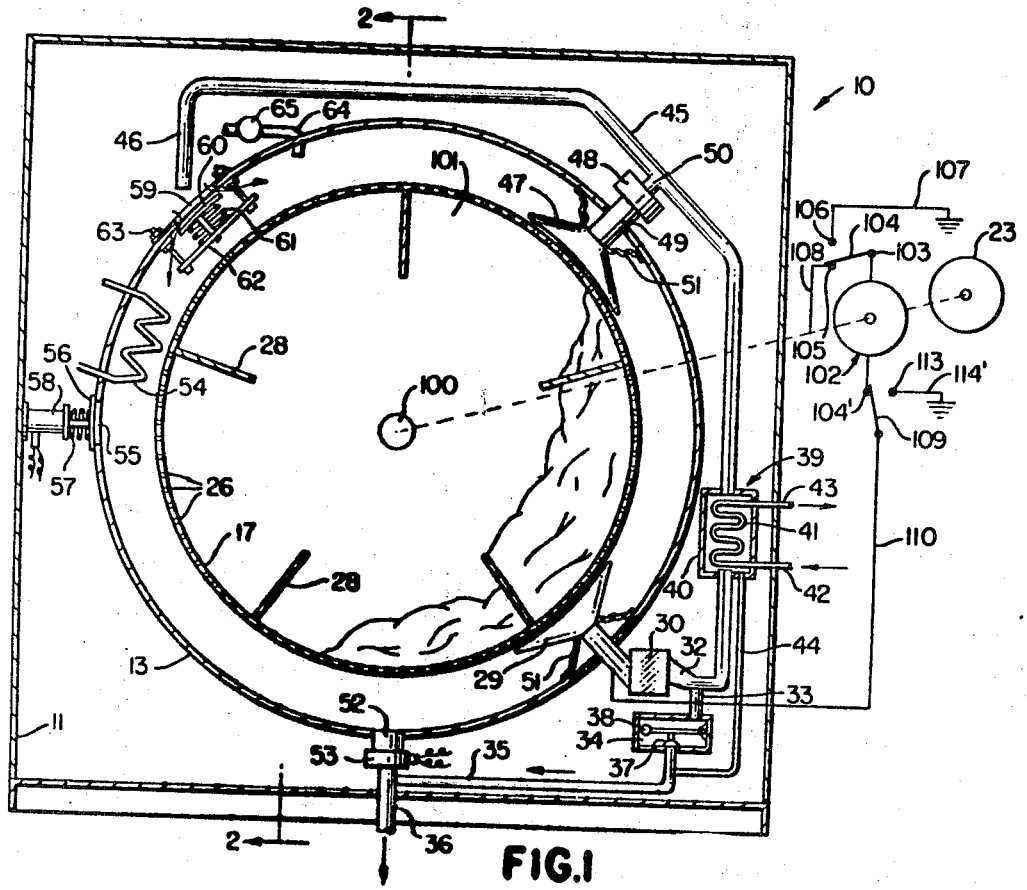
FIG. 1 is an axial cross-secional view of an improved laundry machine of this invention.
Figure 2:
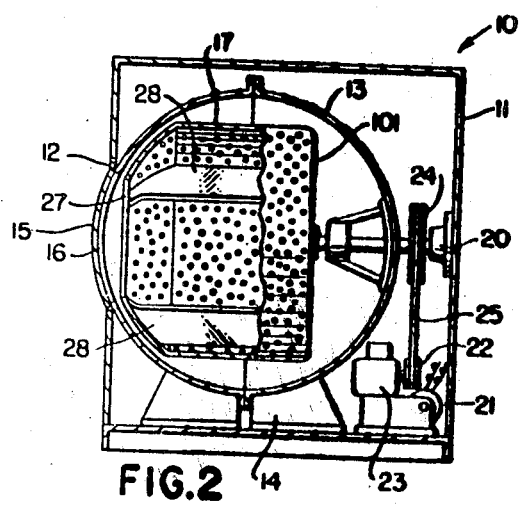
FIG. 2 is a reduced cross-sectional view of the machine illustrated in FIG. 1 and is taken on line 2—2 thereof.

Referring now to FIGS. 1 and 2, an improved laundry machine of this invention is generally indicated by the reference numeral 10 and comprises an outer frame or casing 11 having an opening 12 for the passage of laundry and the like into and out of the machine 10.

A substantially air-tight, stationary drum 13 is disposed in the casing 11 and is supported therein by suitable supports 14. The drum 13 may have any desired configuration other than the spheroidal configuration illustrated, the important feature being that the drum 13 will not collapse when the air pressure inside the drum 13 is lowered to the desired pressure in a manner and for a purpose hereinafter described.

The drum 13 has an opening 15 provided therein for the passage of laundry and the like into and out of the drum 13. A suitable door 16 is hingedly mounted to the drum 13 and is adapted to open and close the opening 15 in the drum 13, the door 16, when in the close position, being substantially air-tight and non-collapsible.

A foraminous carriage 17 is disposed in the drum 13 and is carried on a shaft 18 passing through the drum 13 and rotatably supported in bearings 19 and 20 respectively carried by the drum 13 and the casing 11. In this manner, the carriage 17 can be rotated in the drum 13 by a motor 21 driving a pulley 22 through a reducer 23, the pulley 22 being interconnected to a pulley 24 carried on the shaft 18 by a suitable belt drive 25 or the like.

The carriage 17 has a plurality of openings 26 passing therethrough, the openings 26 being large enough to readily permit the passage of water or air or both therethrough.

An opening is formed in one end of the carriage 17 to permit the passage of laundry into and out of the carriage 17, the opening 27 being aligned with the openings 15 and 12 provided respectively in the drum 13 and casing 11.

Suitable baffles 28 are carried on the inside peripheral surface of the carriage 17 to lift clothes on the rising side of the carriage 17 as the carriage rotates.

A suction nozzle 29 is disposed between the carriage 17 and drum 13 and is operatively interconnected to the inlet side of a suitable suction pump 30 by a conduit means 31.

The suction nozzle 29 has its open end disposed adjacent the outer peripheral surface of the carriage 17 and can extend completely across the carriage 17 or partially across the same, as described. Further, the nozzle 29 may be movable toward and away from the carriage 17 in any of the manners set forth in the copending application, Ser. No. 839,232, filed Sept. 10, 1959, and entitled Laundry Machine.

In any event, the suction pump 30, when operating, is adapted to suck moisture and air from wet laundry disposed in the carriage 17 directly through the foraminous carriage 17 into the nozzle 20 and, thus, into the inlet side of the pump 30 in a manner more fully described hereinafter.

The moisture, vapor and air drawn from the drum 13 is forced out of the outlet side of the pump 30 into a conduit means 32 which decreases in cross-sectional area to cause the air delivered by the pump 30 to be compressed in the conduit means 32 and, thereby, give up at least part of its moisture into the conduit means 32.

The moisture present in the conduit means 32 flows downwardly through a conduit 33 into a compartment 34, the bottom of the compartment being interconnected to a conduit 35 leading to a drain conduit 36.

A suitable float valve 37 is disposed in the compartment 34 and normally closes off the conduit 35. However, as the moisture collects in the compartment 34, the rising level of the moisture floats the float 38 upwardly to open the valve 37 and let part of the moisture in the compartment flow to the drain 36.

In this manner, the compressed air in the conduit 32 does not pass to drain 36 because there is always a certain amount of moisture covering the inlet of the conduit 35.

The conduit means 32 lead to a suitable condenser 39 comprising a compartment 40 having a cooling coil 41 disposed therein. Suitable cooling means, such as water and the like, can enter the coil 41 through the inlet 42 and be expelled out through the outlet 43.

In this manner, the air being forced into the compartment 40 from the conduit 32, passes over the cooling coil 41 whereby any vapor in the air condenses and falls to the bottom of the compartment 40, the outlet end of the conduit 32 being disposed above the bottom of the compartment 40 to prevent the condensed moisture from entering the conduit 32.

Condensed moisture in the compartment is fed to the conduit 35 by a conduit 44, the end of the conduit 44 disposed in the compartment 40 being below the free end of the conduit 32.

After the air passes over the cooling coil 41, the dried air can be expelled to the atmosphere or vented, as desired.

Alternately, the air can be fed from the cooling chamber 40 through a conduit 45 having an outlet end 46 so positioned for a purpose hereinafter described.

A second suction means can be carried by the machine 10 and can comprise a suction nozzle 47 disposed closely adjacent the carriage 17 and inside the drum 13, the nozzle 17 being interconnected to the inlet side of a suction pump 48 by a conduit 49.

The outlet side of the pump 48 is interconnected to the inlet side of a suction pump 48 by a conduit 49.

The outlet side of the pump 48 is interconnected to the conduit 45 by a branch conduit 50.

The conduits 31 and 49 pass through the drum 13 and have flexible sealing means 51 connected thereto and to the drum 13 to prevent air and water leakage from drum 13 into the housing 11.

The interior of the drum 13 is interconnected to the drain conduit 36 by a conduit 52, the conduit 52 having a suitable solenoid operated valve 53 therein.

An electrical heater 54 is disposed between the drum 13 and carriage 17 and is operated in a conventional manner.

The drum 13 has an opening 55 formed therein which is controlled by a valve member 56 normally urged to the closed position by a spring 57. The valve member 56 is moved to the opened position thereof by the energization of a solenoid 58.

Another opening 59 is formed in drum 13 adjacent the outlet 46 of the conduit 45, the opening 59 being controlled by a valve member 60 normally being urged to its closed position by a spring 61 disposed between the valve member 60 and a support 62 adjustably carried on bolts 63 attached to the drum 13.

In this manner, the force of the compression spring 61 tending to hold the valve member 60 in the closed position thereof can be selectively varied.

Water is adapted to be fed into the drum 13 by a conduit 64 having conventional valve means 65.

The operation of the laundry machine 10 will now be described.

Soiled laundry or the like and soap or detergent are introduced into the carriage 17 of the laundry machine 10 through the door 15 in a conventional manner.

Thereafter, the door 15 is closed and wash water of the desired temperature is adapted to be introduced into the drum 13 through the conduit 64, the valve means 65 and 53 being selectively operated to permit the water introduced into the drum 13 to rise to the desired level.

Thereafter, the carriage 17 is rotated to cause a tumbling action of the clothes through the wash water in a conventional manner.

During this washing cycle, the solenoid 58 can be operated to open the valve member 56 so that the washing action can take place with normal atmospheric conditions existing in the drum 13.

Alternately, one feature of this invention can be utilized during the washing cycle of the laundry machine 10.

In particular, the solenoid 58 can be so actuated that the valve member 56 is disposed in sealing relation against the opening 55 in the drum 13.

Thereafter, the suction pump 48 is operated to cause the suction nozzle 47 to tend to reduce the pressure of the air in the drum 13 below normal atmospheric conditions existing outside the drum 13.

By proper regulation of the force of the compression spring 61 acting on the valve member 60, the suction means 47 and the valve means 60 permits the air pressure inside the drum 13 to be reduced to and maintained at a selected pressure below normal atmospheric pressure.

The amount of reduction of the air pressure in the drum 13 coupled with the latent heat of the wash water will cause the wash water to boil even though the wash water is at approximately 140 degrees Fahrenheit or the like.

It is believed that this boiling action of the wash water during the wash cycle will enhance the dirt removing action of the wash water on the soiled laundry or the like.

While the heater 54 is illustrated as being in the upper region of the laundry machine 10 it is to be understood that the heater 54 can be disposed in the lower region thereof whereby the same will be submerged in the wash water so that the heater 54 can be utilized to heat up or maintain the temperature of the wash water at a selected temperature so that the suction means 47 can cause the wash water to continuously boil during the wash cycle.

Alternately another heater could be utilized.

Thereafter, the wash water is drained through the drain 52 by opening the solenoid valve 53 in a conventional manner and opening the valve member 56.

Subsequently, one or more rinse cycles can be utilized whereby rinse water is introduced through the conduit 64 in much the same manner as the wash water and the carriage 17 is rotated to tumble the laundry through the rinse water.

During the rinsing cycle it may be desired to also use the suction means 47 to reduce the air pressure in the drum 13 below normal atmospheric pressure, and, in combination with the valve means 60, to maintain the air pressure in the drum 13 at a selected reduced air pressure.

Thus, the rinse water will also tend to bubble or boil, the rinse water either being hot itself or being heated by the heater means 54 as desired.

After the rinse water has been drained from the drum 13, the laundry machine 10 is now adapted to perform a drying operation.

After the water has been drained from the drum 13 by opening hte valve means 53, the suction pump 30 is turned on whereby the suction nozzle 29 forms a sucking action on the clothes being accumulated in the carriage 17 to tend to draw moisture therefrom out to the outlet 32 as set forth in the aforementioned co-pending application.

During this drying action, the carriage 17 can be continuously rotated to continuously bring new accumulations of clothes adjacent to the suction nozzle 29.

However, while the suction nozzle 29 is removing moisture from the wet laundry, the valve means 56 can be closed and the suction means 29, in combination with the valve means 50, can reduce and maintain the air pressure in the drum 13 at a selected air pressure below the normal atmospheric air pressure outside the drum 13.

If the air pressure inside the drum 13 is reduced to such an extent that the latent heat of the wet laundry in combination with the reduced air pressure will cause the moisture in the wet clothes to more readily evaporate than if the air pressure was not reduced.

Further, the heater element 54 can be turned on whereby the air that is drawn through the valve means 50 passes over the heater 54 to heat up the wet laundry so that the moisture in the wet laundry more readily tends to evaporate in the reduced atmosphere produced in the drum 13.

Thus, as the moisture is being continuously withdrawn or sucked from the wet laundry by the suction means 29, the suction means 29 also cooperates with the valve means 60 to reduce and maintain the air pressure in the drum 13 at a selected reduced air pressure below the normal atmospheric air pressure outside the drum 13 to more readily evaporate the moisture from the wet laundry.

If desired, the suction means 47 can also be operating during this time to assist the nozzle in reducing the air pressure in the carriage 13.

Alternately, only the suction means 47 can be utilized during the drying action whereon the suction means 47 cooperates with the valve means 60 to reduce the air pressure in the drum 13 to such an extent that, in combination with either the heated air coming through the valve means 60 and over the heater element 54 or the latent heat of the wet laundry, the moisture in the wet laundry tends to readily evaporate and pass out through the suction nozzle 47 in the above manner.

If desired, the combination of the heat of the wet laundry and the reduced air pressure can be so arranged that moisture in the wet laundry actually boils at a low temperature that will not adversely affect the laundry.

Therefore, it can be seen that the method and apparatus of this invention not only provides improved means for treating laundry or the like with water or the like by causing the water to boil or bubble, but also the method and apparatus of this invention provides improved means for removing moisture from wet laundry by a suction action and/or by an evaporative action for drying the laundry.

After the laundry has been dried in the above manner, the operation of the machine 10 is terminated and the dry laundry can be removed from the laundry machine 10 in the conventional manner.

While the above operation of the laundry machine 10 has been described as being a continuous operation, it is to be understood that each of applicants' novel features can be separately used or in various combinations thereof in other laundry machines or the like.

For example, applicants' drying apparatus need not be utilized with a washing machine and conversely, applicants' washing apparatus may not be utilized with a drying machine.

While the laundry machine 10 has been described as completely drying the wet laundry, it is to be understood that the drying operations of applicants' invention can be utilized merely for removing enough moisture from the wet laundry thereof for the desired purpose whereby the conventional centrifuging operation can be eliminated.

Another embodiment of this invention is generally indicated by the reference numeral 10A and parts thereof similar to the embodiment of FIG. 1 are indicated by like reference numerals followed by the reference letter "A."

Figure 3:
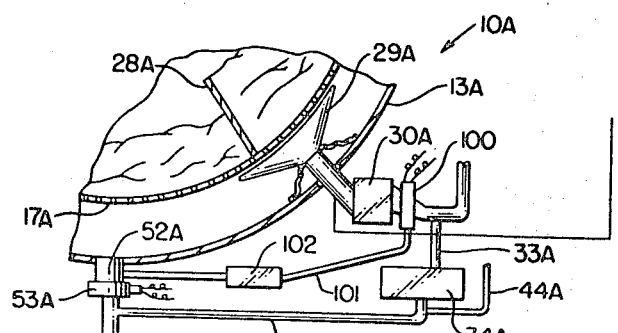
FIG. 3 is a view similar to FIG. 1 and illustrates another embodiment of this invention.

As illustrated in FIG. 3 the pipe 32A has a solenoid-operated valve 100, which, when energized during the wash cycle, prevents the outflow from the suction means 30A from passing beyond the valve means 100 and directs the outflow of the suction means 30A into a pipe 101 leading to the drain pipe 52A above the valve means 53A, the pipe 101 having a filter means 102 therein. When the valve 100 is de-energized, the valve closed the pipe 101 from the outflow of the suction means 30A and permits the outflow from the suction means 30A to pass beyond the valve means 100 into the pipe 32A for the moisture removal cycle previously described.

When the machine 10A is being utilized in the wash cycle thereof, the suction means 30A is turned on and the valve means 100 is energized whereby the suction means causes a large volume of the body of wash water in the confining means 13A to be drawn through the laundry on the foraminous carriage 17A and through the foraminous carriage 17A into the nozzle inlet means 29A and suction means 30A and, by means of the valve means 100, through the pipe 101 and filter 102 back to the confining means 13A because the valve means 53A is closed below the pipe 101 at the drain pipe 52A.

In this manner, the suction means 30A causes the wash water to thoroughly wash the laundry as the carriage 17A is rotating because a large volume of wash water is being forced through the laundry into the aligned nozzle means 29A, the filter 102 removing dirt and lint from the wash water before it is returned to the confining means 13A. This wash cycle can also be accomplisehd with the other features of the washing operation of the machine 10 previously described. Of course, the rinsing operation could be the same for the machine 10A as the described wash cycle therefor.

When the machine 10A performs its moisture removal cycle, the valve means 100 is de-energized and the valve 53A is opened whereby the body of liquid drains out of the confining means 13A through the pipe 36A. Thereafter, the suction means 30A is utilized in the same manner as the suction means 30 previously described for the moisture removal and/or drying operation for the wet laundry remaining in the confining means 13A.

While the apparatus 10 and 10A are previously described as relying on the large volume of air being drawn through the laundry and foraminous portions 17 and 17A into the nozzle inlet means 29 and 29A to remove the moisture from the laundry for a drying operation, it is to be understood that such moisture removal portion can be assisted by an electrostatic feature of this invention.

As illustrated in FIG. 1, the motor means 23 of FIG. 2 is illustrated schematically in FIG. 1 for rotating a shaft means 100 of the apparatus 10 that is interconnected to the end wall 101 of the foraminous carriage 17 so as to be in electrical conductive relationship with the carriage 17 while being electrically insulated from its surrounding tub 13 and frame means 11 as well as from the motor 23 as will be apparent hereinafter.

The shaft 100 rotates an electrostatic machine or apparatus 102 in unison with its rotation of the foraminous drum 17 whereby the electrostatic device 102 creates a differential between two terminal means 103 and 105' thereof when the shaft 100 is rotated by the motor 23 in a manner well known in the art.

A switch blade 104 is electrically interconnected to the terminal 103 of the electrostatic device 102 and is adapted to be moved between terminals 105 and 106, the terminal 106 being interconnected to the ground by a lead 107 and the terminal 105 being interconnected to the conductive portion of the shaft 100 by a lead 108.

Figure 4:
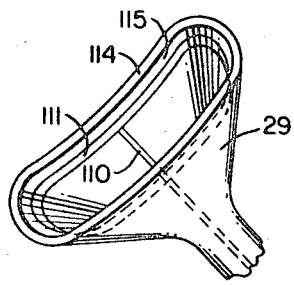
FIG. 4 is a fragmentary perspective view of a typical nozzle means for the apparatus of FIGS. 1 or 3 and illustrates the electrode means therefor.
Figure 5:
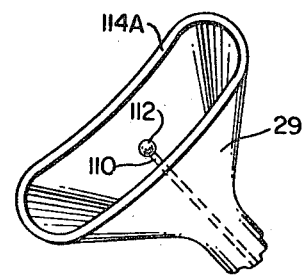
FIG. 5 is a view similar to FIG. 4 and illustrates another embodiment of this invention.

Another switch blade 109 is provided and is electrically interconnected by a lead 110 to an electrode means inside the suction nozzle means 29, such as the electrode means 111 of FIG. 4 or electrode means 112 of FIG. 5. The switch blade 109 is movable between the terminal 104' of the electrostatic machine 102 and a terminal 113 interconnected to ground by a lead 114'.

The electrode means 111 for the nozzle means 29 of FIG. 4 is recessed below the opened end 114 thereof and extends completely around the inside peripheral surface 115 thereof, the electrode 111 being completely electrically insulated from the nozzle means 29 in any suitable manner, such as by forming the nozzle means 29 from a non-conductive material. However, in the embodiment of FIG. 5, the electrode 112 is disposed centrally in the open end 114A of the nozzle 29 while being recessed below the open end 114A and also being suitably electrically insulated from the nozzle means 29 of the supporting lead means 110.

The operation of the apparatus 10 utilizing the electrostatic means 102 will now be described in connection with a drying operation.

After the laundry has been washed in the manner previously described and the body of treating liquid has been removed through the drain 52 in the manner previously described, the drum 17 is rotated by the motor 23 and tumbles the laundry in the drum 17 while the pump 30 is being operated to tend to draw a large volume of fluid through the laundry and foraminous surface 17 into the nozzle inlet means 29 for the drying operation previously described.

During this drying operation, the switch blades 109 and 104 are either manually or automatically moved from their respective ground terminals 113 and 106 against the terminals 104' and 105 to create a potential differential between the drum 17 and the electrode means 111 or 112 of the suction nozzle means 29. Because a potential differential now exists between the electrode 111 or 112 of the nozzle means 29 and the moisture in the laundry being tumbled in the rotating drum 17, not only does the large volume of air being directed into the nozzle inlet means 29 through the laundry and foraminous portion 17 by the pump 30 cause the moisture in the laundry to enter the nozzle inlet means 29 in the manner previously described, but also the potential differential between the moisture in the laundry and the electrode 111 or 112 of the nozzle means 29 causes the moisture to enter the nozzle means 29 in a manner believed to be at a faster rate than if the electrostatic device 102 was not utilized.

Further, by providing the foraminous drum 17 with a potential by the electrostatic device 102, such potential is also created for the moisture in the laundry as the same comes into contact with the drum 17 so that a relatively large potential differential is created between the moisture in the layer of laundry disposed against the drum 17 and the electrode 111 or 112 of the nozzle means 29 when that particular layer of laundry comes into alignment with the nozzle inlet opening 114 or 114A to cause the moisture to pass from the laundry through the foraminous surface 17 into the nozzle inlet means 29.

Of course, in the above operation of the apparatus 10, when utilizing the electrostatic device 102, the electrostatic device could still create such potential differential with only the switch blade 109 disposed against the terminal 104' and the switch blade 104 being connected to the terminal 106 leading to the ground so that the drum 17 need not be charged by the electrostatic device 102 to still accomplish the electrostatic moisture removal operation set forth above.

While the apparatus 10 has been described as requiring or utilizing the electrostatic device 102 in combination with the suction pump 30, it may be found that the suction means 30 can be completely eliminated and that moisture removal can be provided solely by electrostatic means.

Figure 6:
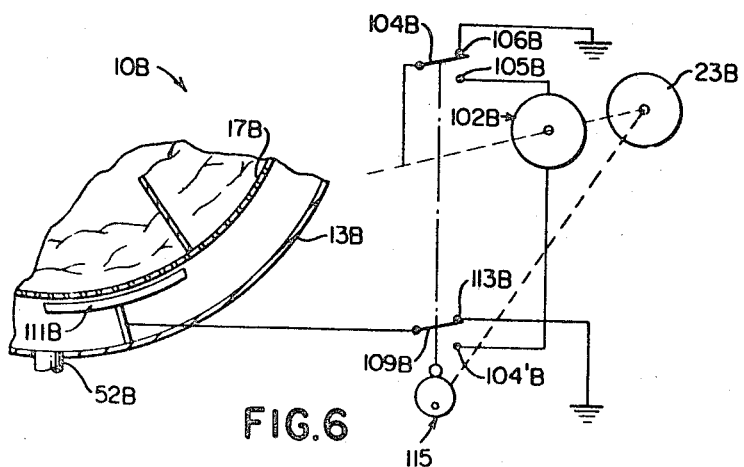
FIG. 6 is a view similar to FIG. 3 and illustrates still another embodiment of this invention.

For example, another embodiment of this invention is generally indicated by the reference numeral 10B in FIG. 6 and parts thereof similar to the apparatus 10 of FIG. 1 are indicated by like reference numerals followed by the reference letter "B."

As illustrated in FIG. 6, the foraminous drum 17B is rotated by the electric motor means 23B which also drives the electrostatic device 102B in the manner previously described and being adapted to have its terminal 104'B and 105B respectively interconnected to an electrode means 111B and the foraminous drum 17B by switch blades 109B and 104B.

However, the electrode means 111B is not disposed in a nozzle means 29 in the manner previously described and merely comprises a relatively large plate disposed closely adjacent the rotating drum 17B. The switch blades 109B and 104B are adapted to be cycled in unison between the terminals 113B and 106B leading to ground and the terminals 104'B and 105B leading to the electrostatic device 102B by a camming arrangement 115 driven by the motor means 22B.

In this manner, both the plate means 111B and drum 17B will be cycled by the cam means 115 to ground and to the electrostatic device 102B to respectively have a like potential and a potential differential.

When the plate 111B is cycled to the ground, any moisture being retained thereon by the charged plate 111B would immediately run off the same by gravity and pass out of the tub 13B through the drain means 52B. However, when the potential differential is created between the plate 111B and the moisture in the laundry being tumbled by the rotating drum 17B, such potential differential causes the moisture in the tumbled laundry to be attracted to the plate 111B and pass out of the laundry and through the drum 17B as the laundry comes into alignment with the plate 111B.

Therefore, it can be seen that the improved features of this invention are to utilize either an electrostatic means by itself to remove moisture from wet laundry or the like or in combination with a suction device that also removes the moisture by tending to draw a large volume of air through the laundry and into a suction nozzle means. Also, it may be found that when the suction nozzle means is utilized in combination with the electrostatic means, the suction power required may be less than without the electrostatic means and the nozzle means may not be required to be in sealed relation with the drum, but only closely adjacent thereto whereby no friction or nozzle wear-out problems will exist.

Another laundry apparatus of this invention is generally indicated by the reference numeral 200 in FIGS. 7 and 8 and comprises an outer liquid retaining casing 201 supported in the conventional outer frame means 202 having an opening means 203 to be suitably opened and closed by conventional door means or the like, such as door means 15 previously described.

A rotatable foraminous drum 204 is rotatably mounted in the liquid retaining drum 201 and is supported for rotation at one end thereof on a rotatable shaft 205 and has a front annular band means 206 supported for rotation on front roller means 207 and 208. However, the annular band means 206 includes an electrically insulating material 207 having a plurality of recesses 208 therein respectively receiving the right-hand end of conductive electrode strips 209 that are electrically insulated from the drum means 204 not only by the band means 207, but also by electrically insulating spacer means 210, as illustrated in FIG. 8, which support the electrode strips 209 to the left of the band 207 in FIG. 7.

The foraminous drum 204 is a laminated structure that includes an inner metallic foraminous drum 211 secured to an outer foraminous insulating drum 212, with the resulting perforations 213 passing through the laminated drum 204, as illustrated. The drum 204 can carry a plurality of inwardly directed baffle means 214 in the manner previously described.

The outer liquid retaining drum 201 has an outlet conduit means 215 provided with a solenoid operated valve means 216 which will be opened to empty the drum 201 after the normal washing, rinsing cycles and the like.

The roller 207 of the apparatus 200 is an electrically conductive roller and is electrically interconnected to one side of an electrostatic device 217 by lead means 218 while the other side of the electrostatic device 217 is adapted to be interconnected to the drum 204 through the conventional drive means 219 thereof by a lead 220 in a manner similar to the lead 108 of FIG. 1. In addition, it is to be understood that the leads 218 and 220 can have suitable switching means therein similar to the switching means 104 and 109 previously described.

The other roller 208 of the apparatus 200 is interconnected to ground potential by a lead 221, as illustrated.

The operation of the apparatus 200 during a drying cycle thereof will now be described.

After the water in the drum 201 has been drained therefrom through the outlet conduit 215 in a manner conventional in the art, the remaining wet laundry in the drum 204 is adapted to be tumbled therein by the continuous rotation of the drum 204 in a counterclockwise direction as illustrated by the arrow in FIG. 8.

As the drum 204 rotates in a counterclockwise direction, each electrode 209 serially comes into contact with the roller 207 to have one potential imposed thereon by the electrostatic device 217 being driven by the drive 219 of the drum 204 so that as that particular charged electrode 209 moves from roller 207 toward 208, the same tends to draw the moisture in the laundry aligned therewith out through the perforations 213 of the drum 204 onto the electrode 209. However, as that particular electrode 209 engages the electrode 208, it can be seen that the same is now reduced to ground potential so that the liquid thereon also has its potential reduced to ground potential whereby such liquid will run off the same by gravity onto the bottom of the drum 201 to be expelled out of the conduit means 215 thereof.

If desired, the electrostatic device 217 can also impose an equal and opposite potential on the inner metallic part 211 of the drum 204 to tend to impose such potential on the liquid in the wet laundry so that the same will be more readily attracted toward the electrode means 208 as the same has an equal and opposite potential imposed thereon by the roller means 207 in the manner previously described.

If desired, the perforations 211 through the laminated drum 204 can be of capillary size so that when the liquid in the wet laundry is adjacent a perforation 213, the potential difference between such moisture at the perforation 213 and the adjacent electrode means 208 having a potential imposed thereon tends to draw such moisture through such capillary perforation 213 in such a manner that the same will not tend to re-enter the laundry adjacent the perforation 213.

Therefore, it can be seen that the laundry apparatus 200 is utilizing substantially the same electrostatic principle previously described for the laundry apparatus 10B of FIG. 6, except that the electrodes are moving electrodes and serially have a potential imposed thereon which is subsequently reduced to ground potential as the moving electrode means moves from left to right in FIG. 8.

Another laundry apparatus of this invention is generally indicated by the reference numeral 300 in FIGS. 9 and 10 and comprises a stationary liquid retaining drum means 301 supported in a suitable outer casing means 302 of the laundry apparatus 300, the liquid retaining drum 301 having an outlet conduit means 303 provided with the aforementioned solenoid operated valve means 304 which will open to empty the drum 301 after a washing, rinsing cycle or the like.

A foraminous laminated drum means 305 is rotatably mounted in the liquid retaining drum 301 on the conventional, rotatably driven shaft means 306, the laminated drum means 305 containing an inner foraminous drum 307 formed of electrically insulating material and an outer foraminous drum means 308 formed of electrically conductive material, such as metal, with the perforations 309 of drum 305 passing through the parts 307 and 308 in aligned relation. The drum 305 can carry inwardly directed baffle means 310 to assist the tumbling action in the drum 305, if desired.

An electrostatic device 311 is suitably interconnected to the drive shaft 306 by a driving means 312 and has one side 313 thereof adapted to be electrically interconnected to the outer part 308 of the drum 305 by a lead means 314 while the other side 315 of the electrostatic device 311 is adapted to be interconnected to the drive shaft 306 of the drum 305 by a lead means 316.

The operation of the laundry apparatus 300 during a drying cycle will now be described.

While a body of liquid is still in the casing 301, the electrostatic device 311 is operated in such a manner that the line 314 is electrically disconnected from the outer part 308 of the drum 305, while the line 316 is interconnected to the shaft 306 so that one potential is imposed on the liquid in the casing 301. Subsequently, the body of liquid is drained from the drum 301 out through the open valve means 304 so that the wet laundry remaining in the drum 305 still has that one potential imposed thereon.

Thereafter, the electrostatic device 311 is operated so that the side 313 thereof is interconnected by the lead 314 to the outer part 308 of the drum 305 to impose an equal and opposite potential thereon from that previously imposed on the liquid in the wet laundry.

The potential differential between the moisture in the wet laundry inside the drum 305 and the outer part 308 thereof tends to cause such moisture to move through the perforations 309 in the manner illustrated in FIG. 10 and as the perforation in the part 308 fills up with moisture, the weight of the moisture therein causes the same to fall by gravity onto the bottom of the drum 301 to be expelled out of the conduit means 303.

If desired, during such tumbling action in the drying cycle of the apparatus 300, the lead 314 can be alternately interconnected to the side 313 of the electrostatic device 311 and to ground potential for various periods of time to respectively ground the outer part 308 of the drum 305 and to impose a potential on the same by the electrostatic device 311.

Another laundry apparatus of this invention is generally indicated by the reference numeral 400 in FIG. 11 and comprises an outer casing or frame 401 supporting a stationary liquid retaining drum 402 having an outlet conduit or drain 403 at the bottom thereof to be selectively opened and closed by a solenoid operated valve means 404 in the manner previously described. A rotatable foraminous drum 405 is disposed in the stationary drum or tub 402 in a manner to be rotated relative thereto on suitable drive shaft means 406 and carries a plurality of inwardly directed baffles 407 to assist in the agitation cycles and tumbling cycles.

A conductive screen-like member 408 as illustrated in FIGS. 11 and 12 is supported between the rotatable drum 405 and stationary tub 402 by insulated support means 409 whereby the screen means 408 is in spaced relation from the foraminous drum 405 so as to be out of electrical contact therewith as well as out of electrical contact with the stationary tub 402 by the support means 409.

The screen means 408 is adapted to have one potential imposed thereon by an electrostatic device 410 through a lead means 411 while the foraminous drum 405 is adapted to have an equal and opposite potential imposed thereon from the electrostatic device 410 by a lead means 412 in the manner previously described.

Suitable switching means (not shown) can be utilized in leads 411 and 412 to perform the function of the switching means 104 and 109 previously described for the embodiments of FIGS. 1 and 6.

In any event, during a drying cycle of the laundry machine 400, the wet laundry is tumbled in the rotating drum 405 and as the laundry is brought adjacent the screen 408, the potential imposed thereon by the electrostatic device 410 tends to cause the moisture in the wet laundry to move through the foraminous drum 405 and be collected by the screen means 408 in the manner illustrated in FIG. 12 so that as the weight of the water in the screen means 408 increases, the same falls by gravity onto the lower portion of the stationary tub 402 to flow out of the drain conduit 403 thereof.

Another laundry machine of this invention is generally indicated by the reference numeral 500 in FIG. 13 and comprises an outer casing or frame 501 supporting a stationary liquid retaining tub or drum 502 by electrically insulating support means 503, the tub 502 having the aforementioned drain conduit 504 that can be opened and closed by a solenoid valve means (not shown) and being fluidly interconnected to an outlet nipple 505 of the tub 502 by a spacing, electrically insulating tubular member 506 as fully illustrated in FIG. 14.

An electrostatic device 507 is provided for the laundry machine 500 in a manner similar to the other electrostatic devices and is adapted to impose one potential on the stationary tub 502 by a lead 508 and an equal and opposite potential on the foraminous drum 509 by a lead means 510 in the manner previously described, the foraminous drum 509 being disposed for rotation in the tub 502 by a drive shaft means 511 that is electrically insulated from the outer tub 502 by suitable non-conductive bearing means and the like (not shown).

Accordingly, during the drying cycle of the laundry machine 500, one potential is being imposed on the outer stationary tub 502 while an equal and opposite potential is being imposed on the rotatable foraminous drum 509 to tend to cause moisture to move from the wet laundry being tumbled in the drum 509 to the outer stationary tub 502 by the aforementioned potential differential therebetween and as the same collects on the inside surface of the outer tub 502, the moisture droplets increase in size and tend to run by gravity down to the outlet nipple 505 thereof to drip out of the same and into the outlet conduit 504.

It can be seen that by electrically spacing the outlet nipple 505 of the stationary tub 502 from the outlet conduit 504, the outlet conduit 504 will not impose its ground potential onto the inner stationary tub 502 and by having the outlet conduit 504 sufficiently spaced from the outlet nipple 505 of the outer tub 502, the water dripping from the outlet nipple 505 into the drain conduit 504 will not provide a conductive path between the outer tub 502 and the drain conduit 504 so as to inadvertently ground the tub 502.

Of course, suitable switch means can be disposed in the leads 508 and 510 in a manner similar to the switching means 104 and 109 for the purpose previously described.

While the various features of this invention are concerned with utilizing an electrostatic means or potential differential in removing moisture from that laundry in the laundry machines, whether such laundry machines are washing machines, drying machines or combination washing or drying machines, or dry-cleaning machines, it is to be understood that the various features of this invention can be utilized with other types of appliances, if desired.

In particular, the electrostatic or potential differential feature of this invention can be utilized in connection with an automatic dishwashing machine, a cooking apparatus and a laundry machine as a unit or separately, as will now be described.

Reference is now made to FIG. 15 wherein a typical household kitchen arrangement is generally indicated by the reference numeral 600 and comprises a cabinet structure 601 containing a washer, dryer, or combination washing-drying machine 602, an automatic dishwasher 603 of this invention, a wall oven arrangement 604 of this invention and a range top 605 of this invention. each of which can be selectively interconnected to a common electrostatic device 606 which will perform its potential differential feature on any one of the machines or apparatus 602–605 separately or in combination and could also be utilized to provide the electrostatic means for a home electrostatic copier or duplicator 607, if desired.

Figure 16:
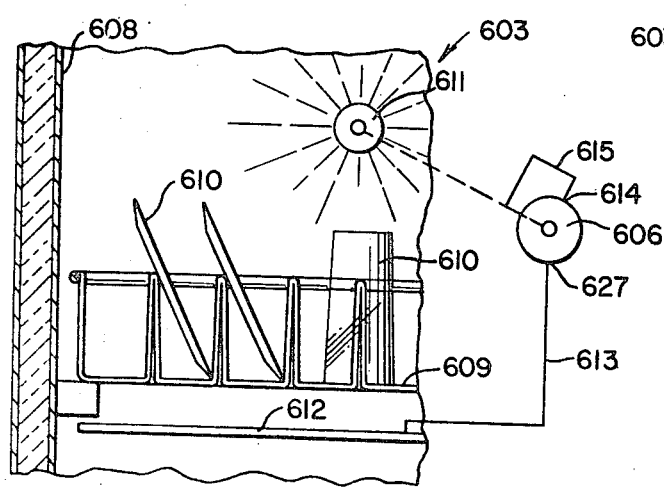
FIG. 16 is a fragmentary, cross-sectional view of a dishwashing apparatus of this invention.

For example, reference is now made to FIG. 16 wherein a conventional automatic dishwashing machine 603 is illustrated and is improved by the electrostatic or potential differential feature of this invention.

As illustrated in FIG. 16, the automatic dishwasher 603 comprises a surrounding casing structure 604 conventional in the art and having suitable rack or support means 609 for supporting dishes 610 and the like that are to be washed by the apparatus 603. In addition, the dishwasher 603 contains the conventional water spray nozzle means 611 which in the schematic view of FIG. 16 is disclosed as a top spray nozzle and it is to be understood that the features of this invention hereinafter applied to the top spray nozzle 611 would also apply to a bottom spray nozzle of the apparatus 603, if desired.

A foraminous or screen-like electrode means 612 of this invention is disposed in spaced relation from the support means 609 below the same so as to be out of electrical contact with the dishes 610 and is electrically insulated from the outer casing 608.

The previously described electrostatic device 606 is adapted to have one side 607 thereof electrically interconnected to the electrode means 612 by a lead 613 while the other side 614 thereof is adapted to be electrically interconnected to the spray nozzle means 611 by lead means 615.

During a washing and/or rinsing cycle of the apparatus 603, the water or other treating liquid being sprayed by the nozzle means 611 against the dishes 610 has one potential imposed thereon by the electrostatic device 606 so that such charged water particles or the like are sprayed against the dishes 610 by the nozzle means 611 whereby the equal and opposite potential being imposed on the electrode means 612 removes such water particles from the dishes 610 after the spraying momentum thereof has been decreased so that the washing effect of the sprayed liquid is not diminished but the same is quickly removed from the dishes 610 by the aforementioned potential differential feature before the same have a tendency to subsequently spot the dishes 610 during a subsequent heating or drying cycle of the apparatus 603.

In fact, it may be found that such differential potential water removal feature for the dishwasher 603 can be utilized without heating the dishes in the dishwasher 603 by the conventional auxilary heaters or can be utilized with such auxiliary heaters that would produce a lower temperature effect in the dishwasher 603 than when the electrostatic feature of this invention is not utilized.

For example, it may be found that a complete washing and drying cycle of the dishwasher 603 can be accomplished without utilizing any auxiliary heat whereby such dishwasher 603 would be readily utilized by housewives and the like to automatically wash their fine china as they would not be afraid of a high heat adversely affecting the same.

By making the electrode means 612 of the apparatus 603 foraminous or of a screen-like material, it can be seen that if a lower spray nozzle arrangement is utilized, the same can spray its treating liquid or water directly through the screen electrode 612 and against the dishes 610 to clean the bottoms thereof. It is believed that the momentum of the water being sprayed through the screen electrode 612 will prevent such sprayed liquid from having the electrode potential imposed thereon whereby after the water hits the dishes 610, it will be attracted back toward the electrode 612 by the aforementioned potential differential feature.

Of course, it is to be understood that if it is not desired to impose one potential on the liquid being sprayed by the nozzle means 611, the spraying means can spray liquid at ground potential on the dishes 610 from both above the top and bottoms thereof and, subsequently, the electrostatic device 606 can be electrically interconnected to the electrode means 612 to impose a potential thereon so that the resulting potential differential between the electrode means 612 and the dishes 610 will tend to remove the moisture thereon in the manner previously described.

It may be found that it is desirable to provide the electrode means for the dishwashing apparatus as a part of the dish supporting means.

Figure 17:
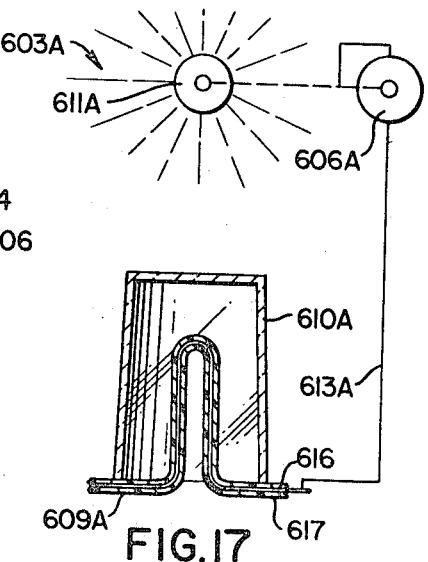
FIG. 17 is a view similar to FIG. 16 and illustrates another embodiment of a dishwashing apparatus of this invention.

For example, reference is now made to FIG. 17 wherein another dishwashing apparatus of this invention is generally indicated by the reference numeral 603A and parts thereof similar to the apparatus 603 previously described are indicated by like reference numerals followed by the reference letter "A."

The apparatus 603A is substantially identical to the apparatus 603 except that the support means 609A of the apparatus 603A is formed from a conductive electrode means 616 covered by electrical insulating means 617 with the electrode means 616 being electrically interconnected to the lead means 613A of the previously described electrostatic device 606A.

In this manner, the potential being imposed on the internal electrode means 616 of the support means 609A performs the same function as the electrode means 612 previously described because the same tends to draw the moisture on the dish means 610A toward the support means 609A by the aforementioned differential potential feature whereby the moisture collecting on the support means 609A will subsequently fall from the same either by gravity as the weight of the droplets thereon increases or by alternately interconnecting the electrode means 616 to the electrostatic means 606A and to ground as previously described in connection with the electrode means 111B of FIG. 6 by suitable switching means in the lead 613A.

Therefore, it can be seen that in the kitchen arrangement 600 of FIG. 15, the automatic dishwasher of the type 603 or 603A can be utilized and that any one of the previously described laundry machines can be utilized for the schematically illustrated laundry machine 602 whereby the electrostatic device 606 will supply its electrostatic force to the apparatus 602 and 603.

Figure 18:
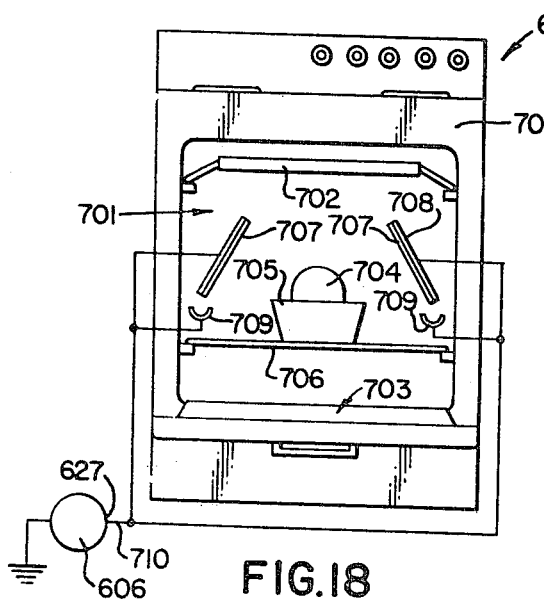
FIG. 18 is a front schematic view of a cooking oven or apparatus of this invention.

The oven 604 schematically illustrated in FIG. 15 can be of the type generally indicated by the reference numeral 604 in FIG. 18 and can comprise an outer casing structure 700 defining a conventional oven cavity 701.

The oven cavity 701 can be provided with conventional broil heating means 702 and bake heating means 703 in order to cook food 704 or the like disposed in a suitable cooking receptacle or pan 705 and being supported on conventional rack means 706 of the cooking apparatus 604.

However, it is well known that during normal cooking operations of an oven or the like, cooking soil collects on the interior walls of the oven cavity 701 which must be subsequently cleaned.

Accordingly, it is a feature of this invention to tend to reduce such cooking soil on the interior walls of the cooking cavity 701 by utilizing the electrostatic or potential differential feature of this invention.

For example, a pair of electrode plates 707 are disposed in the oven cavity 701 and are electrically insulated from the casing 700 while being disposed at an angle so that the outside surface 708 thereof can be covered with insulated material to prevent radiant heating thereof by the broil burner 702.

A pair of collecting troughs 709 are each associated with each plate 707 and are electrically insulated from the oven casing 700.

The electrode plates 707 and associated troughs 709 are respectively adapted to be interconnected to one side 607 of the electrostatic device 606 as suitable lead means 710 as illustrated whereby one potential can be imposed on the plates 707 and troughs 709 by the electrostatic device 606 during the cooking operations.

In this manner, as the food 704 is being cooked in the oven 701, the particles thereof that normally tend to leave the food 704 and splatter against and soil the internal surface means of the oven 701 will be at ground potential and, therefore, will be attracted toward the plates 707 by the aforementioned potential differential being created therebetween by the electrostatic device 606 whereby such soiling particles will collect on and soil the plate means 707 and if a too large amount of such soiling products collect on the plate means 707 so as to tend to drip off the same, the dripping soiling products will drip into the troughs 709 to be retained therein by the potential being imposed thereon by the electrostatic device 606.

Therefore, it is believed that most of the oven soiling particles produced during cooking operations in the oven 701 will be collected on the plates 707 so that the housewife or the like need only clean such plates 707 in a periodic manner without requiring complete cleaning of the entire interior surface walls of the oven 701.

In particular, the plates 707 and/or troughs 709 can be so constructed and arranged that the same are readily insertible and removable from the oven 701 so that the same can be more readily cleaned at the kitchen sink or the like.

Also, it may be found that the electrode plates 707 could actually comprise sheets of aluminum foil whereby the same could be readily disposable and need not be cleaned because the same could be replaced by new sheets of aluminum foil from the conventional aluminum foil rolls that housewives or the like utilize in their kitchens for food wrapping purposes and the like.

While the cooking apparatus 604 has been previously described as having the food 704 at ground potential while the electrode means 707 and 709 are at one potential, it is to be understood that the apparatus 604 could be so constructed and arranged that the supporting racks 706 thereof could have an equal and opposite potential imposed thereon by the electrostatic device 606 being electrically interconnected to the support means 706 thereof or the like so that the soiling particles would have one potential imposed thereon by the electrostatic device 606 to more readily tend to cause the same to collect on the electrodes 707 having an equal and opposite potential disposed thereon by the electrostatic device 606.

It is also believed that such electrostatic potential differential feature can be utilized in preventing soilage in a range top cooking operation. Accordingly, the range top 605 of FIG. 15 is schematically illustrated in FIG. 19 and comprises a top heating element means 800 for supporting and heating a cooking vessel 801 in a conventional manner.

However, as normally occurs during range top cooking operation, cooking splatter and spillage can occur whereby such spillage is normally permitted to pass through an opening means 802 in the range top frame 803 to be received in a collecting pan 804. Sometimes the soiling products collected in such pan 804 are themselves further heated by the heating means 800 so as to cause further splattering and soiling against the frame structure 803 as well as into the kitchen proper.

It is believed, according to the teachings of this invention, that the electrostatic device 606 could have one side 607 thereof electrically interconnected to the collecting plate means 804 by a lead 805 to impose a potential thereon which would cause the dish means 804 to more readily collect the soiling products within and retain the same therein by the aforementioned potential differential feature.

Figure 19:
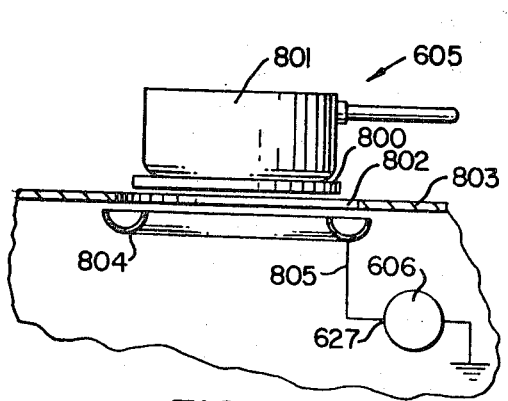
FIG. 19 is a fragmentary cross-sectional view illustrating another cooking apparatus of this invention.

Accordingly, it can be seen that the cooking apparatus 604 and 605 of FIG. 15 can be of the type respectively illustrated in FIGS. 18 and 19 so that a single electrostatic device 606 can be utilized not only with an automatic laundry machine as previously described, but also with an automatic dishwasher and a cooking apparatus as well as the aforementioned home electrostatic copier 607, if such could ever be developed for home use.

While the form of the invention now preferred has been disclosed as required by the statutes, other forms may be used, all coming within the scope of the claims which follow.

What is claimed is:

1. Apparatus for removing moisture from moisture bearing material comprising support means for supporting said moisture bearing material on one side thereof, said support means having capillary-like passage means therethrough adapted to communicate with said moisture bearing material disposed on said support means and tending to draw moisture from said moisture bearing material into said passage means by capilliary action, electrode means disposed adjacent said moisture bearing material, and means for creating a potential differential between said electrode means and said moisture to cause at least part of said moisture to pass out of said passage means of said support means.

2. Apparatus as set forth in claim 1 wherein said last-named means imposes one potential on said electrode means, and means imposes an opposite potential on said moisture to provide said potential differential.

3. Apparatus as set forth in claim 1 wherein means are provided for moving said support means, said electrode means being carried by said support means to move in unison therewith.

4. Apparatus as set forth in claim 1 wherein said electrode means forms part of said support means.

5. Apparatus as set forth in claim 1 wherein said electrode means is disposed adjacent the other side of said support means.

6. Apparatus as set forth in claim 1 wherein said potential differential also causes at least part of said moisture of said moisture bearing material to leave said moisture bearing material and enter into said passage means of said support means.

7. Apparatus as set forth in claim 1 wherein said last-named means creates an electrostatic potential differential between said electrode means and said moisture.

8. Apparatus for removing moisture from moisture bearing material comprising support means for supporting said moisture bearing material on one side thereof, means for moving said support means, said support means carrying electrode means disposed out of electrical contact with said moisture bearing material whereby said electrode means moves in unison with said support means, and means for creating an electrostatic potential differential between said moisture of said moisture bearing material and said electrode means to cause at least part of said moisture to leave said moisture bearing material and move toward said electrode means by the electrostatic potential differential attraction of said electrode means for the moisture in said moisture bearing material while said material, support means and electrode means move in unison.

9. Apparatus as set forth in claim 8 wherein said support means comprises electrically insulating material that electrically insulates said electrode means from said moisture bearing material.

10. Apparatus as set forth in claim 9 wherein said electrode means is fully embedded in said electrically insulating material.

11. A method for removing moisture from moisture bearing material comprising the steps of supporting said moisture bearing material on one side of a supporting means having capillary-like passage means therethrough communicating with said moisture bearing material so as to tend to draw moisture from said moisture bearing material into said passage means by capillary action, disposing electrode means adjacent said moisture bearing material, and creating a potential differential between said electrode means and said moisture to cause at least part of said moisture to pass out of said passage means of said support means.

12. A method as set forth in claim 11 wherein said last-named step creates one potential on said electrode means and an opposite potential on said moisture to provide said potential differential.

13. A method as set forth in claim 11 and including the steps of moving said support means, and causing said electrode means to be carried by said support means so as to move in unison therewith.

14. A method as set forth in claim 11 and including the step of forming said electrode means as part of said support means.

15. A method as set forth in claim 11 wherein the step of disposing said electrode means adjacent said moisture bearing material comprises the step of disposing said electrode means adjacent the other side of said support means.

16. A method as set forth in claim 11 wherein said step of creating said potential differential also causes at least part of said moisture of said moisture bearing material to leave said moisture bearing material and enter into said passage means of said support means.

17. A method as set forth in claim 11 wherein said step of creating said potential differential creates an electrostatic potential differential between said electrode means and said moisture.

18. A method for removing moisture from moisture bearing material comprising the steps of supporting said moisture bearing material on one side of a support means, moving said support means with said material thereon, supporting an electrode means with said support means with said electrode means being disposed out of electrical contact with said moisture bearing material whereby said electrode means moves in unison with said support means, and creating an electrostatic potential differential between said moisture of said moisture bearing material and said electrode means to cause at least part of said moisture to leave said moisture bearing material and move toward said electrode means by the electrostatic potential differential attraction of said electrode means for the moisture in said moisture bearing material while said material, support means and electrode means move in unison.

19. A method as set forth in claim 18 and including the step of forming said support means from electrically insulating material that electrically insulates said electrode means from said moisture bearing material.

20. A method as set forth in claim 19 wherein said last-named step fully embeds said electrode means in said electrically insulating material.

21. Apparatus for removing moisture from moisture bearing material comprising support means for supporting said moisture bearing material on one side thereof, said support means having capillary-like passage means therethrough adapted to communicate with said moisture bearing material disposed on said support means and tending to draw moisture from said moisture bearing material into said passage means by capillary action, electrode means disposed adjacent said moisture bearing material, and means for creating a potential differential between said electrode means and said moisture to cause at least part of said moisture of said moisture bearing material to leave said moisture bearing material and enter said passage means whereby said potential differential assists said capillary action.

22. A method for removing moisture from moisture bearing material comprising the steps of supporting said moisture bearing material on one side of a supporting means having capillary-like passage means therethrough communicating with said moisture bearing material so as to tend to draw moisture from said moisture bearing material into said passage means by capillary action, disposing electrode means adjacent said moisture bearing material, and creating a potential differential between said electrode means and said moisture to cause at least part of said moisture of said moisture bearing material to leave said moisture bearing material and enter said passage means whereby said potential differential assists said capillary action.

23. Apparatus for removing moisture from moisture bearing material comprising support means for supporting said moisture bearing material on one side thereof, electrode means disposed out of electrical contact with said moisture bearing material, means for causing substantially simultaneous movement of said support means and said electrode means in the same direction, and means for creating an electrostatic potential differential between said moisture of said moisture bearing material and said electrode means to cause at least part of said moisture to leave said moisture bearing material and move toward said electrode means by the electrostatic potential differential attraction of said electrode means for the moisture in said moisture bearing material while said material, support means and electrode means move in substantial unison.

24. A method for removing moisture from moisture bearing material comprising the steps of supporting said moisture bearing material on one side of a support means, disposing an electrode means adjacent to said support means and out of electrical contact with said moisture bearing material, substantially simultaneously moving said support means and said electrode in the same direction, and creating an electrostatic potential differential between said moisture of said moisture bearing material and said electrode means to cause at least part of said moisture to leave said moisture bearing material and move toward said electrode means by the electrostatic potential differential attraction of said electrode means for the moisture in said moisture bearing material while said material, support means and electrode means move in substantial unison.

References Cited
UNITED STATES PATENTS

| | | | |
|---|---|---|---|
| 2,511,839 | 6/1950 | Frye | 34—1 |
| 3,405,452 | 10/1968 | Candor et al. | 34—1 |

CHARLES SUKALO, Primary Examiner

U.S. Cl. X.R.

34—92

Dedication 3,546,783.—*Robert R. Candor*, Miami Township and *James T. Candor*, Washington Township, Ohio. ELECTROSTATIC APPARATUS. Patent dated Dec. 15, 1970. Dedication filed Oct. 17, 1980, by the inventor.
Hereby dedicates to the Public the entire term of said patent.
[*Official Gazette January 6, 1981.*]